Patented May 8, 1951

2,551,912

UNITED STATES PATENT OFFICE 2,551,912

AZEOTROPIC DISTILLATION OF NAPHTHALENES

John W. Teter, Chicago, Ill., assignor to Sinclair Refining Company, New York, N. Y., a corporation of Maine No Drawing. Application July 26, 1949,
Serial No. 106,970

4 Claims. (Cl. 202—42)

This invention relates to a method for the concentration of naphthalene and various lower alkylated naphthalenes admixed with non-aromatic hydrocarbons.

Mixtures of naphthalene and lower alkylated naphthalenes (e. g., 1-methylnaphthalene, 2-methylnaphthalene, 2-ethylnaphthalene, etc.) together with non-aromatic hydrocarbons are encountered in the art. For example, such mixtures may be prepared by the fractionation of distillates obtained in the cracking of petroleum using a fluid catalyst process. The separation of naphthalene and homologues from non-aromatic hydrocarbons by the usual means is difficult, if not impossible.

This invention provides a method whereby naphthalene and various lower alkylated naphthalenes, when in admixture with non-aromatic hydrocarbons, may be prepared simply, efficiently and economically in a more highly concentrated form, from which concentrated form the substantially pure naphthalenes and homologues thereof may be produced in a substantially pure form, for example, by freezing them out of the concentrated mixture.

In accordance with the present invention, the concentration of naphthalene and lower alkylated homologues thereof, when in admixture with non-aromatic hydrocarbons, is accomplished by adding benzonitrile to such mixture, and distilling off the non-aromatic hydrocarbons and added benzonitrile as an azeotrope, leaving behind a residue containing an increased concentration of the naphthalene and naphthalene homologues.

The following examples illustrate in detail various modifications of the method of the present invention, and are to be considered not limitative thereof.

Example I

A sample of aromatic (naphthalene) rich fraction obtained by fractionating a fluid catalyst pilot plant stock, the fraction having a sp. gr. of 0.800 and containing approximately 12% naphthalenes (together with non-aromatic hydrocarbons) was blended with an equal volume of benzonitrile, and the mixture was thereafter fractionated on a semi-micro still. The following table contains data concerning this distillation.

| Per Cent Distilled | Overhead Temperature, °F. |
|---|---|
| initial | 320 |
| 4 | 365 |
| 10 | 365 |
| 20 | 373 |
| 25 | 375 |
| 30 | 375 |
| 40 | 375 |
| 50 | 375 |
| 55 | 377 |
| 60 | 380 |
| 70 | 380 |
| 75 | 381 |
| 80 | 390 |
| 90 | 418 |

The significant plateaus, indicating azeotropes of benzonitrile and non-aromatic hydrocarbons, yielded the following analyses, the nitrogen contents being determined by the Kjeldahl method.

| Per Cent Distillate | N 20/D | Per Cent N | Per Cent Benzonitrile | Per Cent Hydrocarbon | Calc. N 20/D of hydrocarbon |
|---|---|---|---|---|---|
| 4–10 | 1.5040 | 8.1 | 59.6 | 40.4 | 1.463 |
| 35–40 | 1.5125 | 9.5 | 69.9 | 30.1 | 1.474 |
| 65–70 | 1.5183 | 9.9 | 72.8 | 27.2 | 1.489 |

The fraction having the boiling range 381–418° F. contained 9.6% nitrogen, and the residue boiling above 416° F. contained 0.67% nitrogen and had a refractive index of 1.5537. This residue weighed 10 gms., and calculated 4.9% benzonitrile and 95.1% hydrocarbon. By cooling this residue to minus 10° F., there crystallized therefrom 4 gms. of solids consisting essentially of naphthalene and lower alkylated naphthalenes.

Example II

The procedure of Example I was repeated, using twice the amount of benzonitrile. The following distillation data were obtained.

| Per Cent Distillate | Overhead Temperature, °F. |
|---|---|
| initial | below 320 |
| 3 | 372 |
| 10 | 376 |
| 14 | 377 |
| 20 | 381 |
| 30 | 382 |
| 40 | 384 |
| 47 | 384 |
| 50 | 387 |
| 60 | 387 |
| 70 | 387 |
| 80 | 387 |
| 85 | 388 |
| 88 | 389 |
| 91 | 402 |

The procedure of this example yielded the same amount of residue as was obtained in Example I, viz., 10 gms. However, in this instance the residue contained 0.37% nitrogen, giving a calculated benzonitrile content of 2.7% and a hydrocarbon content by difference of 97.3%.

Example III

In this test, a cracked fraction containing 19.8% naphthalene and lower alkylated naphthalenes together with non-aromatic hydrocarbons was blended with two volumes of benzonitrile and fractionated. Distillation data obtained on this mixture, as well as distillation data obtained on the unblended fraction, are contained in the following table.

| Per Cent Distillate | Overhead Temperature mixture °F. | Overhead Temperature, °F. |
|---|---|---|
| initial | 330 | 384 |
| 4 | 365 | 398 |
| 7 | 367 | 400 |
| 10 | 367 | 404 |
| 20 | 367 | 408 |
| 24 | 367 | 408 |
| 27 | 369 | 408 |
| 30 | 369 | 410 |
| 34 | 369 | 410 |
| 37 | 370 | 411 |
| 40 | 370 | 411 |
| 45 | 370 | 412 |
| 47 | 370 | 416 |
| 50 | 370 | 416 |
| 54 | 370 | 416 |
| 56 | 371 | 416 |
| 60 | 371 | 416 |
| 66 | 371 | 419 |
| 68 | 371 | 419 |
| 70 | 372 | 419 |
| 72 | 372.5 | 419 |
| 74 | 373 | 421 |
| 80 | 373 | 425 |
| 88 | 373 | 434 |
| 89 | 390 | 434 |
| 90.5 | 411 | |
| 93 | 415 | |

The distillation curve of the blended fraction reveals a sharp break, with a residue boiling above 415° F., constituting 7.0% of the volume of the blend or 21.0% of the volume of the unblended fraction taken. This residue contained no nitrogen, and was a white solid at 20° C. The weight of solid residue recovered was 13.3 gms., or 30% of the original unblended fraction. This white solid consisted essentially of naphthalene and lower alkylated naphthalenes.

The material produced in accordance with the present invention may, if desired, be suitably oxidized using known procedures to produce acid anhydrides which may be employed in the preparation of alkyd resins. Also, the benzonitrile may be conveniently separated from admixture with the non-aromatic hydrocarbons by means of a conventional steam distillation.

I claim:

1. The method for the separation of naphthalene and various lower alkylated naphthalenes from mixtures containing the same and non-aromatic hydrocarbons which comprises azeotropically distilling said mixture with an agent consisting essentially of benzonitrile.

2. The method for the separation of naphthalene and various lower alkylated naphthalenes from mixtures containing the same and non-aromatic hydrocarbons which comprises azeotropically distilling said mixture with an agent consisting essentially of benzonitrile, and thereafter cooling the distillation residue to crystallize therefrom a mixture of naphthalene and said naphthalenes.

3. The method for the separation of naphthalene from mixtures containing the same and non-aromatic hydrocarbons which comprises azeotropically distilling said mixture with an agent consisting essentially of benzonitrile.

4. The method for the separation of naphthalene from mixtures containing the same and non-aromatic hydrocarbons which comprises azeotropically distilling said mixture with an agent consisting essentially of benzonitrile, and thereafter cooling the distillation residue to crystallize therefrom naphthalene.

JOHN W. TETER.

REFERENCES CITED

The following references are of record in the file of this patent:

UNITED STATES PATENTS

| Number | Name | Date |
|---|---|---|
| 2,368,597 | Morris et al. | Jan. 30, 1945 |
| 2,431,515 | Shepardson | Nov. 25, 1947 |